United States Patent [19]

Brullmann et al.

[11] Patent Number: 4,646,503

[45] Date of Patent: Mar. 3, 1987

[54] SET OF STRUCTURAL ELEMENTS FOR THE INSTALLATION OF EXHIBITION AREAS, RESIDENTIAL AREAS OR ANY AREAS USED FOR OTHER PURPOSES

[75] Inventors: Cuno Brullmann, Paris; Arnaud F. Lavergnolle, Nogent sur Marne; Etienne Erlong, Courbevoie, all of France

[73] Assignee: Bureau Technique du Batiment, d'Amenagements et de Constructions, Paris, France

[21] Appl. No.: 812,380

[22] Filed: Dec. 23, 1985

[30] Foreign Application Priority Data

Dec. 21, 1984 [FR] France .................................. 84 19628

[51] Int. Cl.⁴ .............................................. F16B 7/04
[52] U.S. Cl. .................................... 52/646; 403/264; 403/297
[58] Field of Search ............... 403/230, 241, 245, 248, 403/171, 170, 174, 297, 264, 178; 52/656, 648, 665, 290, 657, 646

[56] References Cited

U.S. PATENT DOCUMENTS

| | | | |
|---|---|---|---|
| 2,192,048 | 2/1940 | Mueller | 403/297 |
| 2,519,464 | 8/1950 | Haseltine | 403/405.1 |
| 3,811,785 | 5/1974 | Hagglund | 403/264 |
| 4,102,529 | 7/1978 | Neblung | 403/297 |
| 4,122,646 | 10/1978 | Sapp | 52/648 |
| 4,129,975 | 12/1978 | Gabriel | 403/171 |
| 4,549,832 | 10/1985 | Sterl | 403/264 |
| 4,556,337 | 12/1985 | Marshall | 403/255 |

FOREIGN PATENT DOCUMENTS 1021311 3/1966 United Kingdom .................. 52/291

Primary Examiner—John E. Murtagh
Attorney, Agent, or Firm—Oblon, Fisher, Spivak, McClelland & Maier

[57] ABSTRACT

A set of construction elements for erecting three-dimensional structures comprises hollow structural members used either as posts or as longitudinal beams and also comprises hollow assembly blocks provided with a series of openings in different orientations. The projecting head of an attachment end-fitting mounted within the end portion of a structural member can be latched within each opening of the assembly block. The attachment end-fitting of each structural member is mounted for displacement in axial sliding motion within the interior of the structural member. A movable locking wedge is placed transversely within an attachment end-fitting and inserted through corresponding openings of the respective structural member. Rigid attachment of the structural member to the assembly block is achieved by clamping the edges of the assembly block opening between the flanges of the projecting latch-head of the attachment end-fitting and the end of the structural member.

12 Claims, 14 Drawing Figures

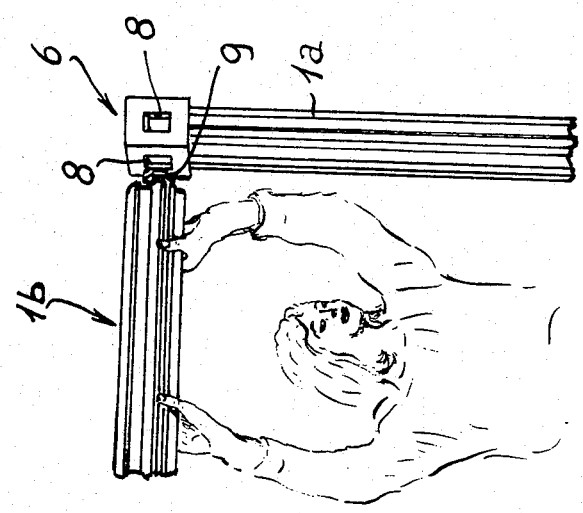
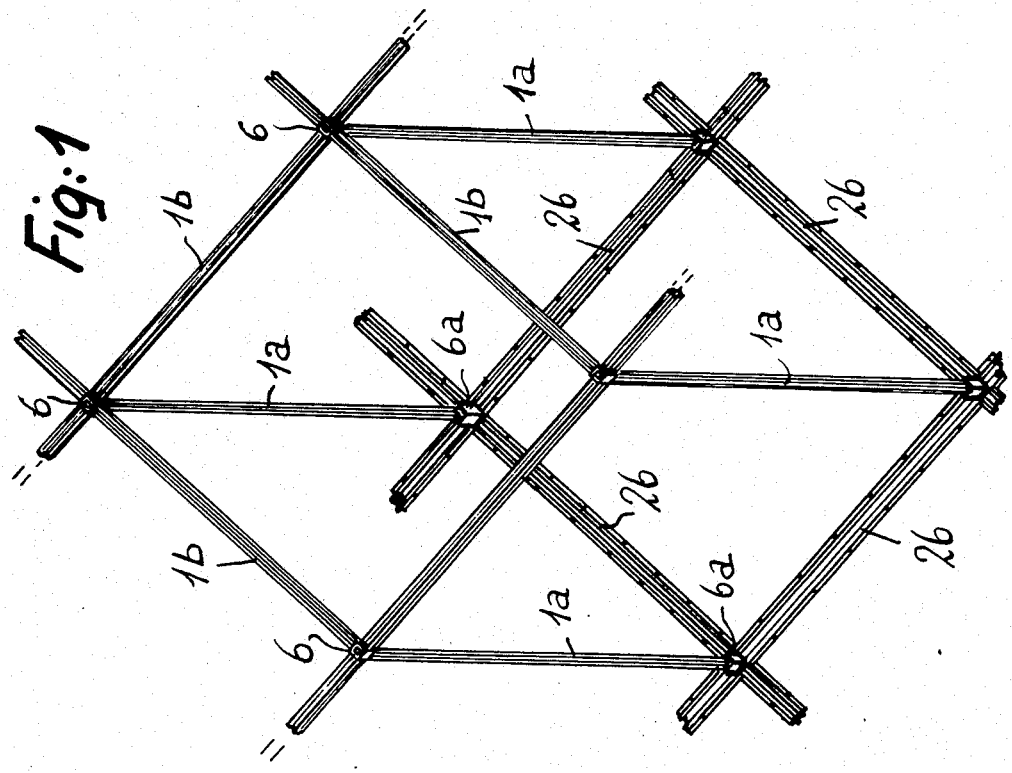

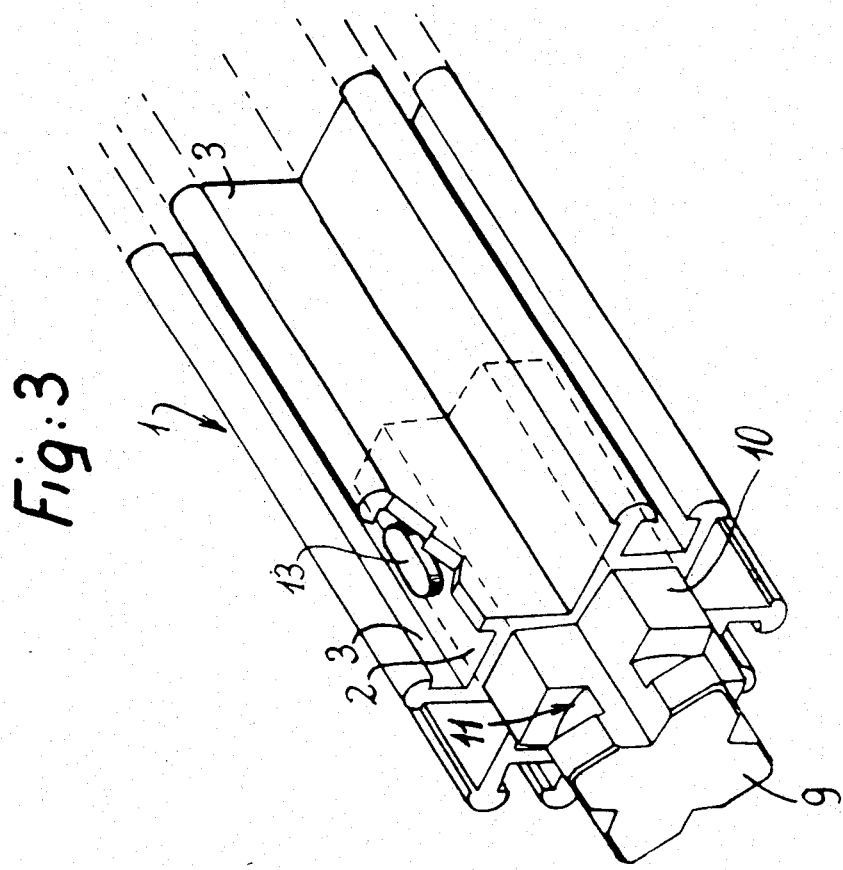
Fig:3
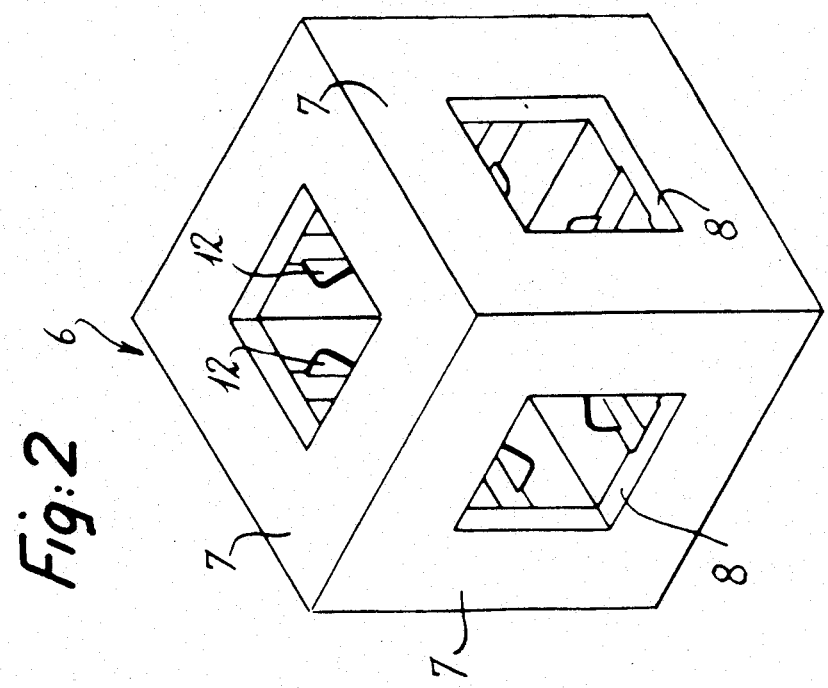
Fig:2

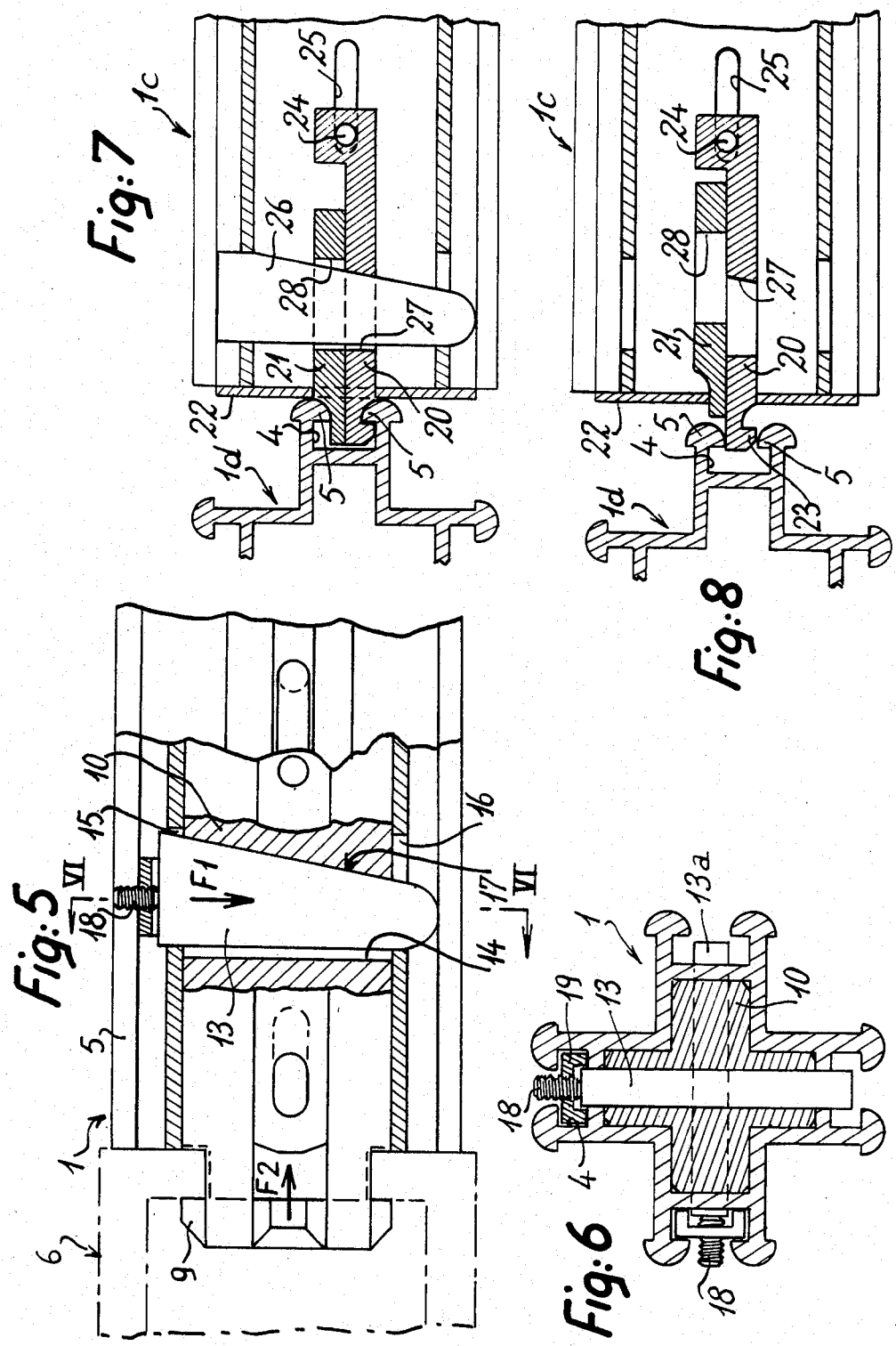

SET OF STRUCTURAL ELEMENTS FOR THE INSTALLATION OF EXHIBITION AREAS, RESIDENTIAL AREAS OR ANY AREAS USED FOR OTHER PURPOSES

BACKGROUND OF THE INVENTION

1. Field of the Invention

The present invention relates to a set of structural elements for the erection of three-dimensional structures with a view to installing exhibition areas, residential areas, office areas or areas having any other functions.

2. Description of the Prior Art

There already exist a number of different structural assembly systems which are designed for such purposes as those mentioned above and make it possible in particular to erect partition-walls, intermediate floors, separate cells, and so on. These assemblies are so arranged as to permit considerable flexibility of use as well as a possibility of either disassembly or modification of the structures erected by means of the corresponding structural elements.

Thus German patent Application No. DE 1,775,597 describes a system for the assembly of shaped sectional members by means of a nodal junction element consisting of a hollow block in which an opening is formed in each of its different faces. Each shaped sectional member is attached to said nodal junction element by means of the curved ends of a blade spring placed within the end portion of each sectional member. It is thus only necessary to insert the ends of said blade spring within one of the openings of a nodal junction element in order to secure the corresponding sectional member. However, this attachment is effected simply by interengagement and fails to provide a sufficient degree of strength and rigidity to permit the use of a system of this type for the assembly of building members.

In regard to German patent Application No. DE 2,633,147, this document describes a system of assembly in which provision is again made for junction elements each formed by a hollow block having openings which are oriented in different directions. In the case of this system, the end portion of each sectional member carries a fastening end-piece terminating in a head which is capable of rotational engagement within one of the openings of a nodal junction element. Said fastening end-piece is screwed into a nut carried by the end of the corresponding sectional member, and it is possible to tighten the end-piece head after engagement of this latter. However, in this case also, the tightening action achieved is not sufficiently effective to permit adoption of the system for the assembly of construction elements since accidental unscrewing is liable to occur under the action of impacts or vibrations.

In another German patent Application No. DE 2,100,874, this specification describes a truss, or trelliswork beam structure in which the corresponding beams are attached to sectional members placed at the point corresponding to their junction lines. These sectional members are provided with channels which have a constriction at the entrance and are intended to receive the bulged ends of assembly elements carried by the corresponding beams. These assembly elements are slidably mounted within the ends of said beams, which are stationarily fixed in position as a result of the clamping action of coupling screws. However, this system is not sufficiently effective to permit of its adoption for building elements. Furthermore, the system is designed for the assembly of beams against structural junction members but could not be transposed to the case of connection of the ends of different beams to a common junction element.

In the case of French patent Application No. 2,268,970, this specification describes elements which are designed to form a structural framework and consist of sectional members provided with grooves having a throttled portion at the groove inlets. These grooves are intended to receive the locking lug of a fastening end-piece for the purpose of fixing another structural member placed at right angles. These grooves can also receive assembly components for fixing other elements such as, for example, partition-wall panels or the like. However, these different assembly components entail the need to engage the locking lug of each component within the corresponding groove starting from one end of a sectional member, then to bring said component into the desired position by displacement in sliding motion. Furthermore, the framework members thus provided do not comprise any means for connecting the sectional members in different directions around common nodal junction elements for the purpose of erecting a three-dimensional structure.

OBJECTS OF THE INVENTION

For the reasons stated in the foregoing, the object of the present invention is to provide a set of structural elements so designed as to permit rigid interassembly of shaped sections around a number of different nodal junction elements or so-called assembly blocks for the purpose of erecting three-dimensional structures which are capable of withstanding relatively high stresses. However, this structural assembly is also designed with a view to ensuring that a shaped section or any other desired accessory can be readily fixed at any point along the length of a predetermined shaped section.

SUMMARY OF THE INVENTION

The set of elements under consideration comprises hollow metallic sections (hereinafter designated as structural members) which can serve indifferently either as posts or as longitudinal members. The set of elements further comprises junction connectors each formed by a hollow assembly block provided with a series of openings in different orientations. The projecting head of an attachment end-fitting mounted within the end portion of a structural member can be latched within each opening of said assembly block. However, the distinctive feature of this set of structural elements lies in the fact that the attachment end-fitting thus provided in the end portions of the structural members is mounted for displacement in axial sliding motion within the interior of said structural members. Provision is made for a movable locking wedge placed transversely within an attachment end-fitting of the type aforesaid and inserted through corresponding openings of the respective structural member. This arrangement makes it possible to fasten said structural member to a junction connector or so-called assembly block by clamping the edges of one opening of said assembly block between the flanges of the projecting head of the attachment end-fitting and the end of the structural member.

In accordance with another distinctive feature, the structural members are each provided with a series of flat faces oriented in different directions. The sides of each flat face are adapted to carry two parallel strips which define a groove and the sides of which are each provided with an inwardly projecting terminal retaining bead. Devices are provided for fixing another structural member or accessory at any point along the length of a structural member. Each device is provided with two fastening brackets which are intended to be placed side by side within one of the grooves of a structural member. A flange is formed at the end of at least one of the fastening brackets and adapted to be applied against the terminal retaining bead carried by one of the sides of the corresponding groove.

Thus the end of another structural member or another equipment element such as a suspension member or a cross-bracing member, for example, can be readily fixed against a predetermiend structural member. This attachment operation can in fact be carried out at any point along the length of the structural member considered, since each attachment device provided for this purpose has two fastening brackets which can be placed side by side after having been introduced separately within the corresponding retaining groove, either one after the other or at different points.

BRIEF DESCRIPTION OF THE DRAWINGS

Other features of the invention will be more apparent upon consideration of the following description and accompanying drawings, wherein:

FIG. 1 is a fragmentary view in perspective showing a three-dimensional structure which is erected by means of elements in accordance with the invention;

FIG. 2 is a view in perspective showing an assembly block which forms part of a construction set consisting of structural elements;

FIG. 3 is a fragmentary view in perspective showing one of the end portions of a structural member which also forms part of said construction set, said end portion being equipped with a removable attachment end-fitting;

FIG. 4 is a view in perspective illustrating the mode of attachment of a structural member of this type to an assembly block;

FIG. 5 is an axial sectional view of a structural member in accordance with FIG. 3 after said member has been attached to the assembly block of FIG. 2;

FIG. 6 is a transverse sectional view taken along line VI—VI of FIG. 5 but to a different scale;

FIG. 7 is a fragmentary transverse sectional view of a structural member against which is fixed laterally another identical structural member placed at right angles;

FIG. 8 is a similar view illustrating the initial operation of engagement of the structural member which has thus been fixed in position;

DESCRIPTION OF THE PREFERRED EMBODIMENTS

Figure 9:
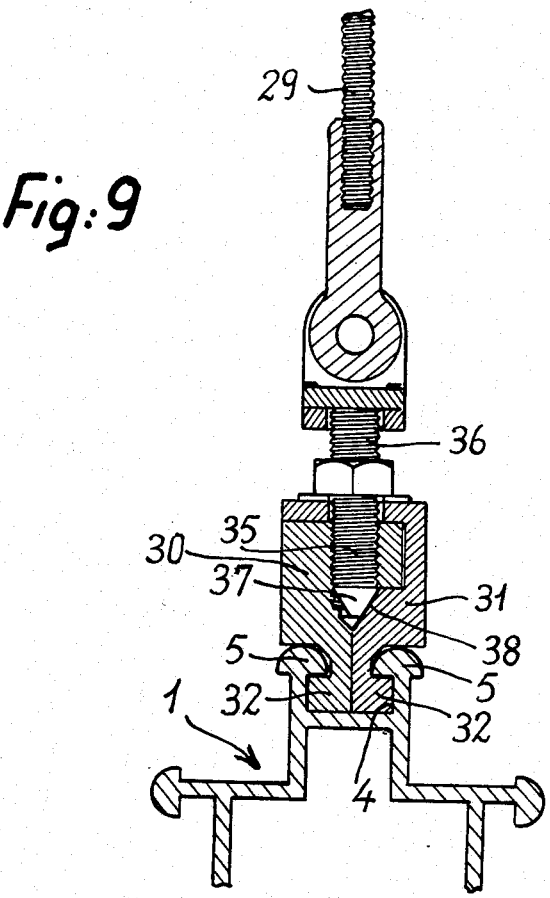
FIG. 9 is a fragmentary transverse sectional view of a structural member on which a suspension rod is fixed laterally.

The principal elements of the construction set consist of shaped metallic sections designated as structural members which can serve indifferently as either posts or longitudinal beams. The construction set further comprises assembly blocks for interconnecting said structural members and attachment end-fittings adapted to secure said structural members to said blocks.

FIG. 3 illustrates one of the structural members 1 of the construction set. The structural member under consideration is a hollow sectional member having a cruciform cross-section. A flat end face 2 formed on each arm of said cruciform-section member and is located between two parallel projecting strips 3. Said strips are located in the line of extension of the walls of the corresponding arm of the structural member, and a groove 4 is defined between them. Furthermore, the edge of each projecting strip 3 has a terminal retaining bead 5 which forms both an inward projection and an outward projection. As will hereinafter be explained in greater detail, the design function of the beads 5 and the grooves 4 of the different arms of the structural member 1 is to retain means for attaching wall elements or any other desired elements of a predetermined structure.

FIG. 2 illustrates one of the assembly blocks 6 of the construction set. Each assembly block 6 assumes the shape of a hollow cube, each face 7 of which is provided with an opening 8 having a square contour. Said opening 8 is intended to receive a projecting latch-head 9 of an attachment end-fitting 10 which is adapted to engage within the end portion of a structural member 1.

As illustrated in FIGS. 3 and 6, said end-fitting 10 has a cruciform cross-section in order to permit engagement within the end portion of a structural member 1 while leaving the latch-head 9 of said end-fitting 10 in an outwardly projecting position. Said latch-head 9 has a square cross-section of slightly smaller area than that of the openings 8 of the assembly blocks 6 in order to permit engagement through one of said openings 8. Moreover, the different corners of said latch-head 9 coincide with the axes of the different arms of the structural member 1 when the aforementioned attachment end-fitting 10 is in position within said structural member 1 (as shown in FIG. 3). Furthermore, said latch-head 9 is separated from the actual body of the corresponding end-fitting 10 by a circular groove 11, the width of which is slightly greater than the thickness of the walls of the assembly block 6.

In order to latch a structural member 1 in an assembly block 6, it is necessary to place said structural member 1 in the position illustrated in FIG. 4—that is, in a position in which the corners of the latch-head 9 are located opposite to the corners of an opening 8 in the assembly 6. After engagement of the latch-head 9 within said block 6, it is only necessary to rotate the structural member 1 about its own axis through an angle of 45° in order to ensure that each corner of the latch-head 9 is subsequently located behind one of the sides of the opening 8, thus effectively latching the structural member 1 in the desired position. Moreover, the walls of an assembly block 6 can be provided on their internal faces with locking recesses 12 which are intended to serve as housings for the different corners of the latch-heads 9, with the result that the latch-heads 9 can be placed in position with greater ease. After completion of this latching operation, the structural member 1 is securely attached to the assembly block 6 by making use of tightening means which produce a wedging effect.

As illustrated in FIGS. 5 and 6, these tightening means are constituted by a wedge 13 engaged transversely within an opening 14 which extends right through each end-fitting 10, said wedge 13 being also engaged through corresponding openings 15 and 16 of the respective walls of the respective structural member 1. The wedge face which is remote from the latch-head 9 of the end-fitting 10 has an inclined ramp 17 placed in contact with a surface having the same angle of slope and formed on the corresponding wall of the opening 14 of said end-fitting 10. Thus, inward displacement of the wedge 13 in the direction of the arrow F1 has the simultaneous effect of subjecting the latch-head 9 to a tractive force in the axial direction indicated by the arrow F2 and of forcibly applying the end of the structural member 1 against the outer face of the assembly block 6 in the opposite direction. Extremely effective clamping of the latch-head 9 against said assembly block 6 is thus achieved, with the result that the structural member 1 is rigidly fixed in position.

Displacement of the locking wedge 13 is carried out by operating a jackscrew 18 which is screwed in a yoke 19. Said yoke 19 is engaged within the groove 4 formed in the structural member 1 and located above the end face of said wedge 13. Under these conditions, the assembly is securely locked in position when the jackscrew 18 is tightened hard up. However, a second locking wedge 13a may if necessary be placed at right angles to the first in order to provide enhanced locking action. This second wedge is shown in FIG. 6.

As already indicated in the foregoing, the structural members 1 can be employed indifferently for the purpose of erecting posts and longitudinal beams of a three-dimensional structure of the type illustrated by way of example in FIG. 1. The lower ends of the structural members 1a which serve as posts are fixed in assembly blocks 6a as will be explained in the description which follows below. The upper ends of said posts are assembled with other identical structural members 1b which serve as longitudinal beams, this assembly operation being performed by means of blocks 6 such as those described earlier. As thus constituted, the structure can serve as a support for wall elements or other equipment elements by employing the retaining grooves 4 of the different arms of the structural members 1 for the purpose of mounting attachment devices therein and thus making it possible to fix said equipment elements or accessories.

The attachment devices just mentioned are so designed as to permit mounting in position at any desired point along the length of the structural members 1 even if the ends of these latter have already been secured to assembly blocks 6 and if it is consequently not possible to introduce a retaining element in the end of a groove 4 and then to slide said element to the position in which it is intended to be located. To this end, said attachment devices are each provided with two fastening brackets which can be moved to the desired position one after the other.

FIGS. 7 and 8 thus illustrate an attachment device of this type which is more particularly designed to permit abutting attachment of the end portion of a structural member 1c against any predetermined point along the length of another identical structural member 1d, these two structural members being placed at right angles to each other. This device comprises two fastening brackets 20 and 21 which are mounted within the end portion of the first structural member 1c and which are capable of sliding displacement through an opening formed in an end-plate 22 having the function of closing said structural member 1c. The ends of these two brackets 20, 21 project beyond said end-plate 22 and are intended to be engaged within one of the grooves 4 of the structural member 1d.

However, only one of these brackets, namely the bracket 20 in the case illustrated by way of example, is provided with a terminal flange 23, said flange 23 being intended to be brought into a position of engagement in which it is applied against the corresponding terminal retaining bead 5 formed in the groove 4. The function of the other bracket 21 is in fact simply to serve as a packing-piece for the purpose of maintaining the terminal flange 23 of the bracket 20 in the engaged or locked position. The first fastening bracket 20 is attached to the structural member 1c by means of a stud 24 slidably mounted within an elongated slot 25 provided in the corresponding wall of said structural member 1c. In regard to the second bracket 21, this bracket can be displaced in sliding motion to the withdrawn position shown in FIG. 8.

It is thus possible to engage the end of the first fastening bracket 20 within the groove 4 while maintaining the second bracket 21 in the withdrawn position. Thereupon, when the first bracket has been fully engaged, the second bracket 21 can be brought to its final position as shown in FIG. 7. The assembly can then be clamped in position by means of a locking wedge 26 engaged within openings 27 and 28 of the two fastening brackets 20, 21, respectively and also inserted through corresponding openings of the respective walls of the structural member 1c. Under these conditions, said structural member 1c is securely and rigidly fixed in position against the structural member 1d.

Figure 10:
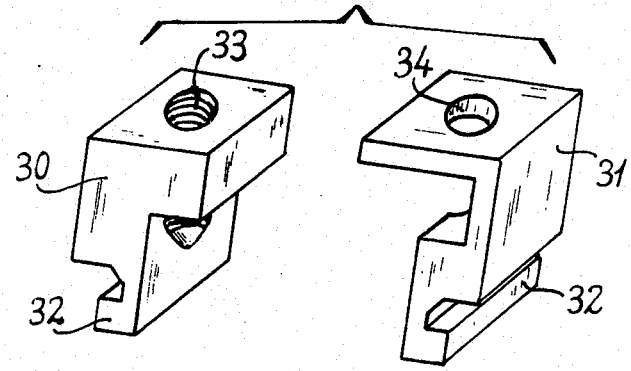
FIG. 10 is a view in perspective showing two retaining brackets of the corresponding attachment device.

FIGS. 9 and 10 illustrate another attachment device which is so designed as to permit attachment of another equipment element or accessory to a structural member 1. In the example shown in the drawings, the element considered consists of a suspension cable or rod 29 which has to be attached at an intermediate point of the length of a structural member 1.

The corresponding attachment device comprises two fastening brackets 30 and 31 provided in each case with a terminal flange 32 which is intended to be brought into a position of engagement in which it is applied against a terminal bead 5 of a lateral retaining groove 4 of the structural member 1. The opposite ends of the two fastening brackets 30 and 31 are intended to close in interfitting relation after said brackets 30, 31 have been engaged within the groove 4 at different points along the length of the structural member 1 in order to permit insertion of the fastening bracket flanges 32. The corresponding end portion of the fastening bracket 30 has an internally-threaded bore 33, whereas the corresponding end portion of the bracket 31 simply has a smooth bore 34. When said bores 33, 34 are in register, they are intended to receive a coupling screw 35 for fastening in position a clevis 36 which carries the accessory to be attached—such as the suspension cable 29, for example.

However, the end of said coupling screw 35 terminates in a conical tip 37 which is applied against seatings 38 of the same shape formed respectively on the internal face of the fastening bracket 31 and on the internal face of the fastening bracket 30. Tightening of the coupling screw 35 thus tends to separate the two brackets 30, 31 and consequently to lock the flanges 32 of the fastening brackets 30, 31 against the terminal retaining beads 5.

It is therefore possible to attach any desired accessory at any predetermined point along the length of a structural member 1. The fastening brackets 30 and 31 can in fact be engaged within a retaining groove 4 at two different points of this latter, then displaced in sliding motion to a point at which they are located opposite to each other in their fastening position.

Figure 11:
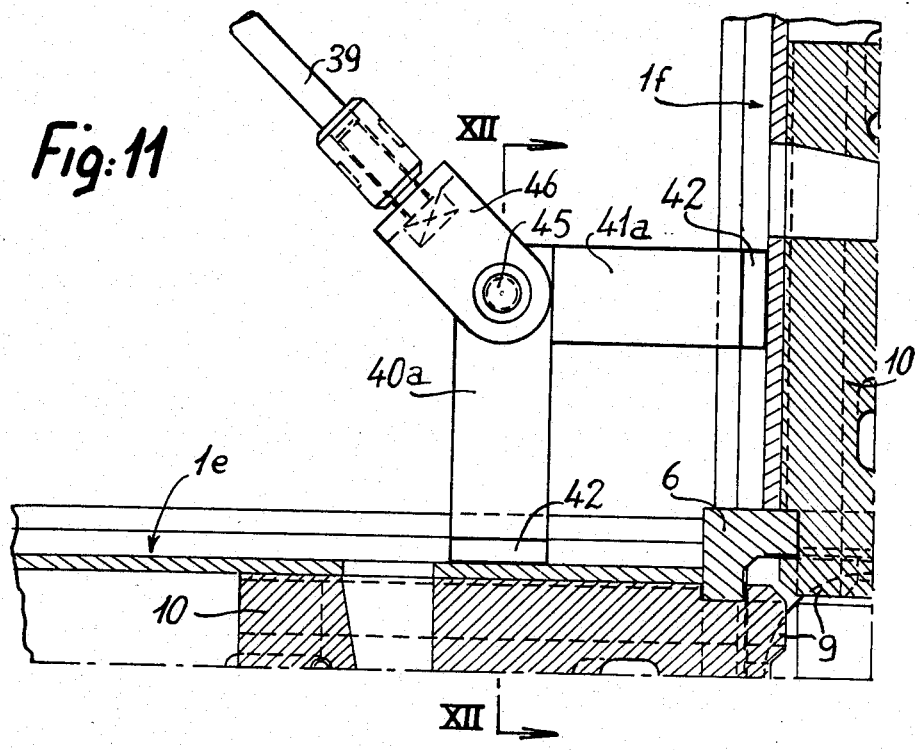
FIG. 11 is a fragmentary view in elevation showing the device for attachment of a cross-bracing rod in the corner formed between two adjacent structural members placed at right angles to each other.
Figure 12:
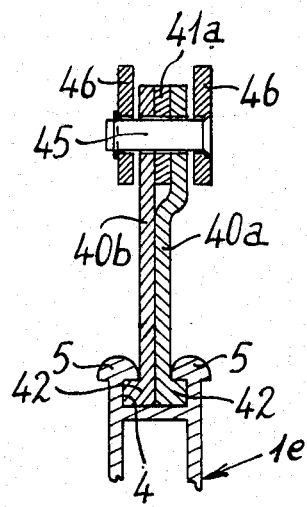
FIG. 12 is a sectional view taken along line XII—XII of FIG. 11.
Figure 13:
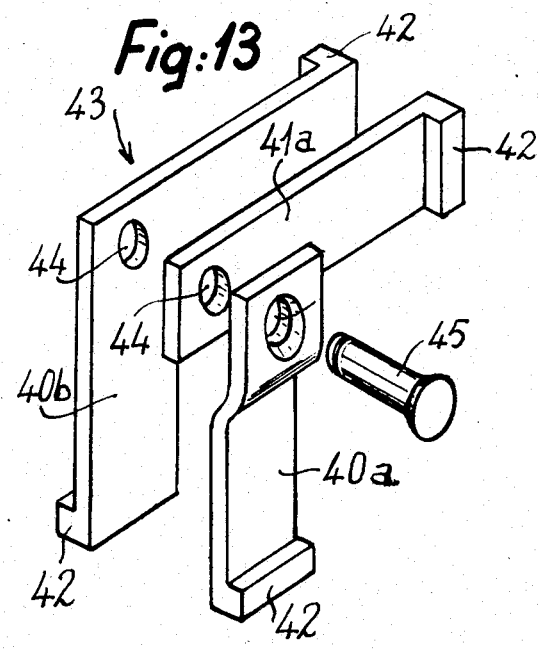
FIG. 13 is a view in perspective showing the fastening brackets of the corresponding attachment device.

FIGS. 11 to 13 illustrate another attachment device for fixing one end of a cross-bracing rod 39 in the corner formed between two structural members 1e and 1f of the same types as the members 1. This device comprises a pair of fastening brackets 40a, 40b and a pair of fastening brackets 41a, 41b. The ends of these two pairs of brackets are provided with flanges 42 which can be locked in position against the terminal retaining beads 5 formed on the sides of the corresponding retaining groove 4 of the structural members 1e and 1f. Preferably, one of the fastening brackets 40b of one of the two pairs is integral with one of the brackets 41b of the other pair, these two brackets being constituted by the two arms of an L-shaped member 43. In regard to the other two brackets 40a and 41a, said brackets are independent of each other. Each of these fastening brackets has a hole 44 for the insertion of a connecting pin 45. Said pin 45 is also engaged through similar holes formed in the two cheeks of a clevis 46 to which the end of the cross-bracing rod 39 is also attached.

Taking into account the fact that the different fastening brackets are pivotally mounted on the pin 45, if it is possible to introduce the ends of the fastening brackets of the same pair at different points along the length of the corresponding groove 4. This accordingly permits insertion of the two retaining flanges 42, whereupon the two fastening brackets of each pair are brought into position opposite to each other, which is their final location as shown in FIGS. 11 and 12. Said fastening brackets are then maintained in this position under the action of the tractive force exerted by the cross-bracing rod 39.

As can be observed, these different fastening devices have a common characteristic in that each device has two fastening brackets which are so designed as to be moved one after the other to a final position in which said two brackets are placed opposite to each other and fill the corresponding retaining groove 4 of a structural member 1 and in which the fastening bracket flanges are in contact with the retaining beads 5 of said groove.

Figure 14:
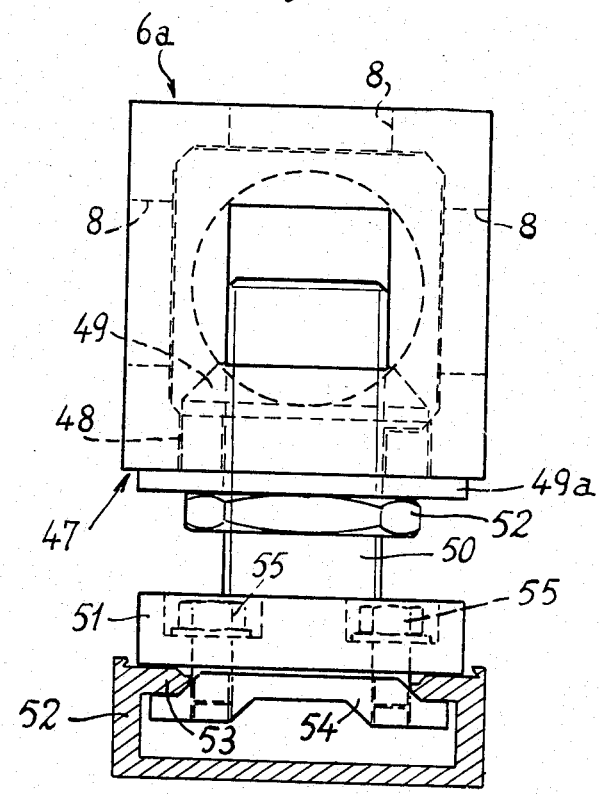
FIG. 14 is a view in elevation showing the attachment device provided at the lower end or foot of each post formed by metallic structural members of the construction set under consideration.

As has already been mentioned, the lower ends of the structural members 1a which serve as posts are fixed in assembly blocks 6a, one of these blocks being illustrated in FIG. 14. This block differs from the assembly blocks 6 described earlier in the fact that its bottom face 47 has an internally-threaded circular opening 48 instead of an opening such as the openings 8 formed in the other faces. In said internally-threaded opening 48, there is screwed a ring 49 provided with a bottom annular flange 49a. A stud 50 carried by a base 51 is screwed within said ring 49. This mode of assembly makes it possible to adjust the height of the assembly block 6a which is locked in the desired position by means of a counter-nut 52.

When the structural elements under consideration are employed in an exhibition area or the like in which the floor has been prepared beforehand, the base 51 of each assembly block 6a is mounted on a rail 53 which is anchored to the floor. Said rail 53 has a generally U-shaped cross-section with inwardly projecting flanges 54. In this application, the base 51 is adapted to carry one or a number of shoes 55 which are engaged within the corresponding rail 53 and which are joined to said base 51 by means of bolts 56. By means of said bolts 56, the base 51 can be stationarily fixed exactly in the desired position by clamping flanges 53 between the shoes 55 and the base 51.

However, in the case of an installation to be erected on a floor which is not already equipped with rails 53, it is only necessary to fix the bases 51 directly on the floor by making use of bolts or any other suitable means.

It will in any case be readily apparent that the structural elements in accordance with the invention are not limited to the example of construction described in the foregoing. Thus the openings 8 of the assembly blocks 6 can have a polygonal contour other than a square contour. Said openings 8 can also have an oval contour. In each of these instances, the latch-head 9 of an attachment end-fitting 10 has the same contour in order to permit of its introduction, whereupon it is only necessary to rotate the corresponding structural member 1 about its own axis in order to lock the latch-head 9 in position within the corresponding assembly block 6. If so required, the openings 8 of said assembly blocks 6 could have a circular contour on condition that provision is made for a certain number of radial slots which are adapted to correspond to retaining lugs on the latch-head 9 of each attachment end-fitting, thus providing a bayonet-type locking system.

Moreover, the assembly blocks 6 could have a shape other than cubic in order to permit the arrangement of structural members 1 in positions other than an orientation at right angles to each other. In that case, each assembly block 6 would have a series of faces oriented in the different directions contemplated for the corresponding structural members 1.

Furthermore, the cross-sectional design of the structural members 1 themselves is not limited to a cruciform shape but can also have any other shape on condition that provision is made for a series of retaining grooves disposed in different orientations and similar to the retaining grooves 4 provided in the structural members 1 described in the foregoing.

The set of construction elements in accordance with the invention can be employed for erecting three-dimensional structures having the intended function of supporting equipment elements of various types such as wall or flooring elements, stepped rows or tiers for amphitheater seating structures, elements for exhibition stands, and so on. The set of elements has a very broad range of potential applications, especially for the temporary arrangement of exhibition areas or else the installation of residential rooms, commercial shops, offices, and so on.

What is claimed is:
1. A set of construction elements, said set comprising:
 (a) a plurality of elongated, hollow structural members, each one of said plurality of elongated, hollow structural members having:
   (i) a plurality of sides, each one of said plurality of sides comprising a flat, longitudinally extending surface, and

(ii) two flat end surfaces containing opening communicating with the hollow interior of said one of said elongated, hollow structural members;

(b) a plurality of hollow assembly blocks, each one of said plurality of hollow assembly blocks having a plurality of flat sides, each one of said plurality of flat sides having an opening therethrough communicating with the hollow interior of said one of said plurality of hollow assembly blocks;

(c) plurality of attachment end fittings, each one of said plurality of attachment end fittings comprising:

(i) an elongated body sized and shaped to fit snugly and non-rotatably into one of said openings in one of said two flat end surfaces on one of said plurality of elongated, hollow structural members;

(ii) a latch-head sized and shaped so as to fit through one of said openings in one of said flat sides on one of said plurality of hollow assembly blocks when oriented in a first way but so as not to fit back through said one of said openings in said one of said flat sides on said one of said plurality of hollow assembly blocks when oriented in a second way; and (iii) a neck connecting said elongated body to said latch-head, said neck being sized and shaped to fit in said one of said openings in said one of said flat sides on said one of said plurality of hollow assembly blocks regardless of the orientation of said latch-head; and (d) a plurality of wedges sized and shaped:

(i) to pass through corresponding, aligned holes in a first side of one of said plurality of elongated, hollow structural members, the elongated body of one of said plurality of attachment end fittings when said elongated body is received in one of said openings in one of said two flat end surfaces of said one of said plurality of elongated, hollow structural members, and a second side, opposite to said first side, of said one of said plurality of elongated, hollow structural members and (ii) to move said one of said plurality of attachment end fittings axially into said one of said openings in said one of said two flat end surfaces of said one of said plurality of elongated, hollow structural members, thereby drawing the corresponding one of said latch-heads against the inside of the corresponding one of said plurality of hollow assembly blocks.

2. A set of construction elements as recited in claim 1 wherein each one of said plurality of hollow assembly blocks is cubical in shape.

3. A set of construction elements as recited in claim 1 wherein each one of said openings in each side of each one of said plurality of hollow assembly blocks is polygonal in shape.

4. A set of construction elements as recited in claim 3 wherein each one of said openings in each side of each one of said plurality of hollow assembly blocks is square in shape.

5. A set of construction elements as recited in claim 1 and further comprising a plurality of locking recesses formed in the interior of each one of said plurality of hollow assembly blocks, each one of said plurality of locking recesses being sized, shaped, and positioned to snugly receive a portion of one of said latch-heads when said latch-head is oriented in its second way.

6. A set of construction elements as recited in claim 1 wherein each one of said necks is at least partially circular in cross-section.

7. A set of construction elements as recited in claim 1 wherein each one of said plurality of elongated, hollow structural members has four sides.

8. A set of construction elements as recited in claim 1 wherein each one of said latch-heads is polygonal in cross-section.

9. A set of construction elements as recited in claim 8 wherein each one of said latch-heads is square in cross-section.

10. A set of construction elements as recited in claim 1 and further comprising a plurality of means for locking each one of said plurality of wedges in position in a corresponding one of said elongated, hollow structural members.

11. A set of construction elements as recited in claim 10 wherein each one of said plurality of means comprises:

(a) a yoke containing a threaded through hole and
(b) a set screw sized and shaped to be threadedly received in said threaded through hole in said yoke and to bear against one of said plurality of wedges.

12. A set of construction elements as recited in claim 1:

(a) wherein each one of said plurality of sides of each one of said plurality of elongated, hollow structural members further comprises a pair of spaced, parallel, longitudinally extending strips projecting outwardly from said flat, longitudinally extending surface to define a groove therebetween and an inwardly projecting terminal retaining bead on the outer end of each one of said pair of spaced, parallel, longitudinally extending strips and (b) further comprising a plurality of pairs of fastening brackets, at least one fastening bracket in each one of said plurality of pairs of fastening brackets having a head thereon and each one of said plurality of pairs of fastening brackets being sized and shaped so that:

(i) when said pair of fastening brackets are oriented relative to each other in a first way, said pair of fastening brackets may be slid past said inwardly projecting terminal retaining beads and into one of said grooves on one of said plurality of elongated, hollow structural members;

(ii) when said pair of fastening brackets are oriented relative to each other in a second way and are recieved in one of said openings in one of said two flat end surfaces of a second one of said plurality of elongated, hollow structural members, one of said plurality of wedges may be passed through corresponding, aligned holes in a first side of said second one of said plurality of elongated, hollow structural members, said pair of fastening brackets, and a second side, opposite to said first side, of said second one of said plurality of elongated, hollow structural members, thereby moving said pair of fastening brackets axially into said one of said openings in said one of said two flat end surfaces of said second one of said plurality of elongated, hollow structural members and drawing said head head on said at least one fastening bracket of said pair of fastening brackets against one of said inwardly projecting terminal retaining beads; and (iii) when said pair of fastening brackets are oriented relative to each other in either the first or the second way, said pair of fastening brackets may be slid longitudinally in said groove.

* * * * *